(12) United States Patent
Park et al.

(10) Patent No.: US 11,271,264 B2
(45) Date of Patent: Mar. 8, 2022

(54) BATTERY MODULE

(71) Applicant: LG Chem, Ltd., Seoul (KR)

(72) Inventors: Sang Min Park, Daejeon (KR); Se Woo Yang, Daejeon (KR); Yoon Gyung Cho, Daejeon (KR); Kyung Yul Bae, Daejeon (KR); Jae Hun Yang, Daejeon (KR); Kyoung Bin Im, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/790,033

(22) Filed: Feb. 13, 2020

(65) Prior Publication Data

US 2020/0185797 A1   Jun. 11, 2020

Related U.S. Application Data

(62) Division of application No. 15/553,336, filed as application No. PCT/KR2016/002000 on Feb. 29, 2016, now Pat. No. 10,615,470.

(30) Foreign Application Priority Data

Feb. 27, 2015   (KR) .................. 10-2015-0028505

(51) Int. Cl.
*H01M 10/653* (2014.01)
*B60L 50/64* (2019.01)
(Continued)

(52) U.S. Cl.
CPC .......... *H01M 10/653* (2015.04); *B60L 50/64* (2019.02); *H01M 10/0525* (2013.01);
(Continued)

(58) Field of Classification Search
CPC .... H01M 10/653; H01M 50/20; H01M 50/24; H01M 10/0525; B60L 50/64
See application file for complete search history.

(56) References Cited

U.S. PATENT DOCUMENTS

| 9,174,417 B2 | 11/2015 | Hoecker et al. |
| 2007/0037053 A1 | 2/2007 | Anantharaman |

(Continued)

FOREIGN PATENT DOCUMENTS

| EP | 1818998 A2 | 8/2007 |
| EP | 2104121 A1 | 9/2009 |

(Continued)

OTHER PUBLICATIONS

JP 4853587 English translation obtained via Google Patents Jul. 30, 2021 (Year: 2011).*

(Continued)

*Primary Examiner* — Sarah A. Slifka
(74) *Attorney, Agent, or Firm* — Lerner, David, Littenberg, Krumholz & Mentlik, LLP

(57) ABSTRACT

Provided are a battery module, a method of manufacturing the same, and a resin composition applied to the method of manufacturing the same. A battery module manufactured with a simple process and low cost but having excellent output for the size thereof, a method of manufacturing the same, and a resin composition applied to the method of manufacturing the same are provided in the present invention.

18 Claims, 8 Drawing Sheets

(51) Int. Cl.
*H01M 50/20* (2021.01)
*H01M 50/24* (2021.01)
*H01M 10/0525* (2010.01)

(52) U.S. Cl.
CPC .......... *H01M 50/20* (2021.01); *H01M 50/24* (2021.01); *H01M 2220/20* (2013.01)

(56) References Cited

U.S. PATENT DOCUMENTS

| | | | |
|---|---|---|---|
| 2009/0250655 | A1 | 10/2009 | Sano et al. |
| 2012/0219838 | A1 | 8/2012 | Terada et al. |
| 2014/0023906 | A1 | 1/2014 | Hashimoto et al. |
| 2014/0356675 | A1 | 12/2014 | Lee et al. |
| 2016/0049622 | A1 | 2/2016 | Hashimoto et al. |

FOREIGN PATENT DOCUMENTS

| | | | |
|---|---|---|---|
| EP | 2467253 A1 | | 6/2012 |
| JP | H01119481 A | | 5/1989 |
| JP | H8162078 A | | 6/1996 |
| JP | 2000108687 A | | 4/2000 |
| JP | 3270644 B2 | | 4/2002 |
| JP | 2005310449 A | | 11/2005 |
| JP | 2008293863 A | | 12/2008 |
| JP | 2009505348 A | | 2/2009 |
| JP | 2011108617 A | | 6/2011 |
| JP | 4853587 | * | 11/2011 |
| JP | 2012174670 A | | 9/2012 |
| JP | 2012174972 A | | 9/2012 |
| JP | 2013231166 A | | 11/2013 |
| JP | 2014103123 A | | 6/2014 |
| JP | 2014116239 A | | 6/2014 |
| JP | 2014175908 A | | 9/2014 |
| KR | 20070071252 A | | 7/2007 |
| KR | 20090037948 A | | 4/2009 |
| KR | 20090110471 A | | 10/2009 |
| KR | 20130046999 A | | 5/2013 |
| KR | 20130062551 A | | 6/2013 |
| WO | 2011061931 A1 | | 5/2011 |
| WO | 2012153752 A1 | | 11/2012 |
| WO | 2014156905 A1 | | 10/2014 |

OTHER PUBLICATIONS

Extended European Search Report and Written Opinion for EP Application No. 16755953.3, dated Oct. 1, 2018.
Search Report for Application No. IN 201727029556 dated Sep. 4, 2019, 2 pages.
Search report from International Application No. PCT/KR2016/002000, dated Jun. 10, 2016.
TCER Thermally Conductive RTV (Ethoxy), Thermal Managment Solutions, Technical Data Sheet, Electrolube, The Solutions People, Dec. 2016.

* cited by examiner

BATTERY MODULE

CROSS-REFERENCE TO RELATED APPLICATIONS

This application is a divisional of U.S. application Ser. No. 15/553,336, filed on Aug. 24, 2017, which is a national phase entry under 35 U.S.C. § 371 of International Application No. PCT/KR2016/002000 filed Feb. 29, 2016, which claims priority from Korean Patent Application No. 10-2015-0028505, filed on Feb. 27, 2015, all of which are incorporated herein by reference.

The present application relates to a battery module.

BACKGROUND ART

Secondary batteries include nickel cadmium, nickel hydride, nickel zinc, lithium secondary batteries, and the like, and the typical battery is the lithium secondary battery.

A lithium oxide and a carbon material are widely used as a positive active material and a negative active material of the lithium secondary battery, respectively. The lithium secondary battery includes an electrode assembly in which positive and negative plates respectively coated with the positive active material and the negative active material are disposed with a separator interposed therebetween and an exterior material that seals the electrode assembly with an electrolyte and can be classified into a can type secondary battery and a pouch type secondary battery according to the shape of the exterior material. In the present specification, a single secondary battery can be referred to as a battery cell.

When the secondary batteries are used for medium and large equipment such as vehicles or power storage systems, many battery cells are electrically connected to each other to form a battery module or a battery pack to increase capacity and output.

To form battery modules or battery packs in which the plurality of battery modules are connected, various coupling elements or cooling devices are required. Accordingly, such coupling elements or cooling devices lead to an increase in manufacturing cost, volume, and weight of the battery modules or the battery packs and lead to a decrease in output for the increased volume and weight.

DISCLOSURE

Technical Problem

The present invention is directed to providing a battery module.

Technical Solution

One aspect of the present invention provides a battery module including a module case and a battery cell. The battery case may be accommodated in the module case. One or more battery cells may be provided in the module case, and a plurality of battery cells may be accommodated in the module case. The number of battery cells is adjusted according to use and the like and is not specifically limited. The battery cells accommodated in the module case may be electrically connected to each other.

The module case may include at least a sidewall and a lower plate forming an inside space in which the battery cell is accommodated. The module case may further include an upper plate that seals the inside space. The sidewall, the lower plate, and the upper plate may be integrally formed or the separate sidewall, lower plate, and/or upper plate may be assembled to form the module case. The shape and size of such a module case may not be specifically limited and may be suitably selected according to the use, shape, and number of battery cells accommodated in the inside space FIG. 1 is a schematic view illustrating an example of a module case (10) in a box shape including one lower plate (10a) and four sidewalls. The module case (10) may further include an upper plate (10c) that seals the inside space of the module case (10).

FIG. 2 is a schematic top view illustrating the module case (10) shown in FIG. 1, in which battery cells (20) are accommodated.

Holes may be formed in the lower plate, the sidewall, and/or the upper plate (hereinafter may be referred to as the lower plate and the like). Such holes may be formed in the lower plate and the like in contact with a resin layer that will be described below and may be formed in the lower plate and the like in contact with the resin layer with a contact area that is 80% or more of the area of the lower plate and the like to be described below. As described below, the holes may be injection holes through which a material for forming the resin layer (a resin composition) is injected when the resin layer is formed by an injection process. Here, the shapes, number, and positions of the holes may be adjusted in consideration of the injection efficiency of the material for forming the resin layer. As one example, the holes may be formed at least in the lower plate.

As one example, the holes may be formed at a position that is between approximately one-fourth point and three-fourth point of the entire length of the sidewall, the lower plate, or the upper plate, between approximately three-eighth point and seven-eighth point of the entire length of the sidewall, the lower plate, or the upper plate, or at approximately the central portion of the entire length of the sidewall, the lower plate, or the upper plate. By injecting the resin composition through the injection holes formed at the above-described positions, the resin layer may have a large contact area. For example, the above described one-fourth, three-fourth, three-eighth, or seven-eighth is a ratio of a distance (A) at which the holes are formed to the entire length (L) measured from any one end surface (E) of the lower plate and the like as illustrated in FIG. 3. In addition, the end (E) from which the length (L) and the distance (A) is measured may be an arbitrary end (E) as long as the length (L) and the distance (A) is measured from the same end (E). In FIG. 3, injection holes (50a) are positioned at approximately the central portion of the lower plate 10a.

The size and shape of each injection hole may not be specifically limited and may be formed by considering the injection efficiency of the material of the resin layer that will be described below. For example, the holes may have a circular shape, an oval shape, a polygonal shape such as a triangular or tetragonal shape, or an amorphous shape. The number of the injection holes and gaps therebetween may not be specifically limited and may be adjusted so that the resin layer may have a large contact area with the lower plate and the like as described above.

Observation holes (for example, 50b in FIG. 3) may be formed at an end portion of the lower plate and the like in which the injection holes are formed. For example, such observation holes may be for observing whether an injected material is sufficiently injected to reach the end of the corresponding sidewall, lower plate, or upper plate when the material of the resin layer is injected through the injection holes. The positions, shapes, sizes, and number of the observation holes are not limited as long as the observation holes are formed to allow determining whether the injected material was suitably injected.

The module case may be a thermally conductive case. The term "thermally conductive case" refers to a case having an overall thermal conductivity of 10 W/mk or more or to a case at least including a portion having the above-described thermal conductivity. For example, at least one of the sidewall, the lower plate, and the upper plate may have the above-described thermal conductivity. As another example, at least one of the sidewall, the lower plate, and the upper plate may include a portion having the above-described thermal conductivity. In the another example, the thermal conductivity may be 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or 195 W/mk or more. The higher the thermal conductivity values are, the more advantageous it is for the thermal dissipation properties aspect and the like of the module, and thus an upper limit is not specifically limited. For example, the thermal conductivity may be approximately 1,000 W/mK or less, 900 W/mk or less, 800 W/mk or less, 700 W/mk or less, 600 W/mk or less, 500 W/mk or less, 400 W/mk or less, 300 W/mk or less, or 250 W/mK or less but may not be limited thereto. A material having the above-described thermal conductivity is not specifically limited and includes, for example, a metal material such as aluminum, gold, pure silver, tungsten, copper, nickel, or platinum. The entirety of the module case may be formed of the above-described thermally conductive material, or at least a portion of a part may be formed of the thermally conductive material. Accordingly, the module case may have thermal conductivity in the above-described range or may include a portion having thermal conductivity in the above-described range.

In the module case, the portion having the thermal conductivity in the above-described range may be a contact portion in contact with the resin layer and/or an insulating layer that will be described below. In addition, the portion having the thermal conductivity may be a portion in contact with a cooling medium such as cooling water. According to such a structure, a structure that may effectively dissipate heat generated from battery cells to the outside may be implemented.

Meanwhile, when a measured temperature has an influence on materials properties among the materials properties described in the present specification and as long as not otherwise specifically described, the materials properties may be materials properties measured at room temperature. In the present specification, the term "room temperature" may refer to any one temperature of in a range of approximately 10 to 30° C. and, for example, may refer to a temperature of approximately 25° C., 23° C., or 20° C.

The kind of battery cell accommodated in the module case is not specifically limited, and all various known battery cells may be applied. For example, the battery cell may be a pouch type. Referring to FIG. 4, a pouch type battery cell (100) may generally include an electrode assembly, an electrolyte, and a pouch type exterior material.

FIG. 4 is an exploded perspective view schematically illustrating a configuration of an exemplified pouch type cell, and FIG. 5 is a combined perspective view illustrating the configuration shown in FIG. 4.

An electrode assembly (110) included in the pouch type cell (100) may be provided in a form in which one or more positive plates and one or more negative plates are disposed with a separator interposed therebetween. The electrode assembly (110) may be classified into a wound type in which one positive plate and one negative plate are wound together with the separator, a stacked type in which a plurality of positive plates and a plurality of negative plates are alternately stacked with a separator therebetween, or the like.

For example, a pouch exterior material (120) may be provided in a form including an outer insulating layer, a metal layer, and an inside adhesive layer. To protect the inside elements such as the electrode assembly (110) and electrolyte and in consideration of strengthening the electrochemical properties against the electrode assembly and the electrolyte and thermal dissipation properties, such an exterior material (120) may include a metal thin film formed of aluminum. Such a metal thin film may be interposed between insulating layers formed of an insulating material for an electrical insulation from elements such as the electrode assembly (110) and the electrolyte or other external elements of the battery (100).

In an example, the exterior material (120) may include an upper pouch (121) and a lower pouch (122), and a concave inside space (I) may be formed in at least one of the upper pouch (121) or the lower pouch (122). The electrode assembly (110) may be accommodated in an inside space (I) of such a pouch. Sealing portions (S) are provided at perimetric surfaces of the upper and lower pouches (121 and 122), and the sealing portions (S) are bonded to each other so that the inside space in which the electrode assembly (110) is accommodated may be sealed.

Electrode taps may be respectively provided at electrode plates of the electrode assembly (110), and one or more electrode taps may be connected to electrode leads. The electrode leads may serve as electrode terminals of the secondary battery (100) by being interposed between the sealing portions of the upper pouch (121) and the lower pouch (122) and being exposed to the outside of the exterior material (120).

The form of the pouch type cell is one example, and the battery cell applied to the present invention is not limited to the above-described types. In the present invention, various known pouch type cells or other types of batteries may be applied as the battery cell.

The battery module according to the present invention may further include a resin layer. The term "resin layer" refers to a layer including a resin component and, in one example, the resin layer may be an adhesive layer. For example, the battery module may include the case and battery cells and may be in contact with any one of the sidewall, the lower plate, or the upper plate. Here, the sidewall, the lower plate, or the upper plate may be a sidewall, lower plate, or upper plate with the above-described thermal conductivity. Meanwhile, in the above description, the term "contact" may refer to a thermal contact. That is, the above-described "contact" may refer to a state in which the resin layer is in direct contact with the lower plate and the like, or, even though other elements, such as an insulating layer that will be described below, may exist between the resin layer and the lower plate and the like, the other elements do not interfere with the thermal transmission between the resin layer and the lower plate and the like. In the above description, the thermal transmission not being interfered refers to a case in which an entire thermal conductivity between the other elements and the resin layer is in a range of approximately 1.5 W/mK or more, 2 W/mK or more, 2.5 W/mK or more, 3 W/mK or more, 3.5 W/mK or more, or 4 W/mK or more even when the other elements (for example, the insulating layer or a guiding portion that will be described below) is provided between the resin layer and the lower plate and the like, or an overall thermal conductivity of the resin layer and the lower plate and the like in contact therewith is in the above-described range even when the other elements are provided. The thermal conductivity of the thermal contact may be 50 W/mK or less, 45 W/mk or less, 40 W/mk or less, 35 W/mk or less, 30 W/mk or less, 25 W/mk or less, 20 W/mk or less, 15 W/mk or less, 10 W/mK or less, 5 W/mK or less, 4.5 W/mK or less, or approximately 4.0 W/mK or less. Such a thermal contact may be obtained by controlling the thermal conductivity and/or the thickness of another element when another element is provided.

The resin layer may be in contact with the lower plate and the like and may also be in contact with the battery cells. The contact between the battery cells and the resin layer is also the above-described thermal contact. In the present invention, by adopting the above-described structure, the number of various coupling parts, a cooling apparatus of the module or the like conventionally required when a general battery module or a battery pack that is a group of such general battery modules is formed may be dramatically decreased, thermal dissipation properties may be obtained, and a module in which more battery cells are accommodated per unit volume may be implemented. Accordingly, the present invention may provide a small sized, light, and high output battery module.

FIGS. 6 and 7 are cross-sectional views illustrating an example of the battery module and, for example, the module may have a form including a case (10) including a sidewall (10b) and a lower plate (10a), a plurality battery cells (20) accommodated in the case (10), and a resin layer (30) in contact (thermal contact) with all of the battery cells (20) and the case (10).

In the above-described structure, the lower plate and the like in contact with the resin layer (30) may be a thermally conductive lower plate as described above.

The contact area between the resin layer and the lower plate and the like may be approximately 70% or more, 75% or more, 80% or more, 85% or more, 90% or more, or 95% or more of the entire area of the lower plate and the like. An upper limit of the contact area is not specifically limited and, for example, may be 100% or less or under approximately 100%.

When the lower plate and the like include a thermally conductive portion, the contact area may be a contact area with the thermally conductive portion, that is, may be a ratio of the contact area to the entire area of the thermally conductive portion.

As described above, the thermally conductive portion or the thermally conductive lower plate and the like may be a portion in contact with a cooling medium such as cooling water. That is, as schematically illustrated in FIG. 6, heat (H) may be easily dissipated through the lower plate and the like, and the heat may be easily dissipated even in the further simplified structure by having the lower plate and the like being in contact with a cooling medium (CW).

The resin layer may have a form having a relatively thin layer as illustrated in FIG. 6 or may fill the inside space of the case (10) as illustrated in FIG. 7. In the above-described case, the battery cells (20) may be provided having been inserted in the resin layer. In the case of a structure shown in FIG. 6, for example, the thickness of the resin layer may be in a range of approximately 100 μm to 5 mm or in a range of approximately 200 μm to 5 mm. In a structure of the present invention, when the resin layer is thin, dissipating heat is advantageous, and when the resin layer is thick, insulating heat is advantageous. Accordingly, by considering the above properties, a suitable thickness of the resin layer may be set. The thickness may be the thickness of the thinnest portion, the thickness of the most thick portion, or the average thickness of the resin layer.

As illustrated in FIG. 6 or 7, a guiding portion (10d) that guides the accommodated battery cells (20) may also exist on at least one inside surface of the module case (10), for example, an area (10a) in contact with the resin layer (30). Here, a shape of the guiding portion (10d) may not be specifically limited and may be suitably adopted in consideration of a shape of the applied battery cells and the like. The guiding portion (10d) may be integrally formed with the lower plate and the like or may be additionally attached thereto. The guiding portion (10d) may be formed of a metal material such as aluminum, gold, pure silver, tungsten, copper, nickel, platinum in consideration of thermal contact. In addition, although not illustrated in drawings, an interleaving paper or an adhesive layer may be provided between the accommodated battery cells (20). The interleaving paper may serve as a buffer when the battery cells are charged and discharged.

The resin layer or the battery module to which the resin layer is applied may have at least one or more materials properties among materials properties that will be described below. The materials properties that will be described below are independent of each other, and materials properties do not take priority over other materials properties. The resin layer may meet at least one of the materials properties requirements that will be described below.

For example, the resin layer may be a thermally conductive resin layer and may have thermal conductivity of approximately 1.5 W/mK or more, 2 W/mK or more, 2.5 W/mK or more, 3 W/mK or more, 3.5 W/mK or more, or 4 W/mK or more. The thermal conductivity may be 50 W/mK or less, 45 W/mk or less, 40 W/mk or less, 35 W/mk or less, 30 W/mk or less, 25 W/mk or less, 20 W/mk or less, 15 W/mk or less, 10 W/mK or less, 5 W/mK or less, 4.5 W/mK or less, or approximately 4.0 W/mK or less. When the resin layer is a thermally conductive resin layer as described above, the lower plate and the like to which the resin layer is attached may be a portion having the above-described thermal conductivity of 10 W/mK or more. Here, a portion of the module case having the above-described thermal conductivity may be a portion in contact with a cooling medium, e.g., cooling water. For example, the thermal conductivity of the resin layer is a value measured based on ASTM D5470 or ISO 22007-2 standard. The method of adjusting the thermal conductivity of the resin layer in the above-described range is not specifically limited.

For example, the thermal conductivity of the resin layer may be adjusted through the type of resin used for the resin layer and/or use of a filler. For example, an acrylic based resin, a urethane based resin, and a silicone based resin among resin materials generally known to be used as an adhesive have similar properties of thermal conductivity, the epoxy based resin have a relatively higher thermal conductivity than the others, and it is known that an olefin based resin has a higher thermal conductivity than the epoxy based resin. Accordingly, a resin having excellent thermal conductivity may be adopted among the variety of resins as necessary. However, since it is difficult to obtain a target thermal conductivity only with a resin material, a method to be described below of adding a filler having excellent thermal conductivity to the resin layer at a suitable ratio may also be applied.

In a battery module, a thermal resistance of the resin layer or the battery module in which the resin layer is applied may be 5 K/W or less, 4.5 K/W or less, 4 K/W or less, 3.5 K/W or less, 3 K/W or less, or approximately 2.8 K/W or less. When the resin layer or the battery module in which the resin module is applied is adjusted to have the thermal resistance in the above-described range, excellent cooling efficiency or heat dissipation efficiency may be obtained. The method of measuring the thermal resistance is not specifically limited. For example, the thermal resistance may be measured based on ASTM D5470 or ISO 22007-2 standard.

The resin layer may have suitable adhesion strength in consideration of effective immobilizing of the battery cells, shock resistance, and vibration resistance in using the module. For example, the resin layer may have adhesion strength of approximately 1,000 gf/10 mm or less, approximately 950 gf/10 mm or less, approximately 900 gf/10 mm or less, approximately 850 gf/10 mm or less, approximately 800 gf/10 mm or less, approximately 750 gf/10 mm or less, approximately 700 gf/10 mm or less, approximately 650 gf/10 mm or less, or approximately 600 gf/10 mm or less. As another example, the resin layer may have adhesion strength of approximately 50 or more, approximately 70 gf/10 mm or more, approximately 80 gf/10 mm or more, or approximately 90 gf/10 mm or more. The above-described adhesion strengths may be values measured at a delamination speed of approximately 300 mm/min and a delamination angle of 180°. In addition, the adhesion strength may be adhesion strength to the module case in contact with the resin layer. For example, when an insulating layer is formed between the lower plate and the like and the resin layer in the module case as described below, adhesion strength to the module case may be adhesion strength to a module case in which the insulating layer is formed. When the above-described adhesion strength is obtained, excellent adhesion strength to various materials of a case included in the battery module and the battery cells may be obtained for example. When the adhesion strength is obtained in the above-described range, delamination and the like due to a change in the volume during charging and discharging the battery cells, a change in the operating temperature of the battery module, contraction due to curing of the resin layer, or the like are prevented in the battery module, and thus excellent durability may be obtained. Such adhesion strength may be obtained by using the resin layer as an adhesive layer for example. That is, since adhesion strengths of known adhesive materials are well known, a material may be adopted in consideration of such adhesion strength.

A resin layer may be required to withstand a thermal shock test, for example, consisting of repeating 100 cycles of being maintained at the low temperature of approximately −40° C. for 30 minutes, raising the temperature to 80° C., and being maintained for 30 minutes and to afterwards show no detachment or delamination from the module case or the battery cells of the battery module or generation of cracks. For example, when the battery module is applied to a product such as a vehicle that requires a long warranty period (in the case of the vehicle, approximately 15 years or more), the level of performance as described above may be required.

The resin layer may be an electrically insulating resin layer. In the above-described structure, by the resin layer being electrically insulating, performance of the battery module may be maintained and safety may be guaranteed.

The electrically insulating resin layer may have an insulation breakdown voltage of approximately 3 kV/mm or more, approximately 5 kV/mm or more, approximately 7 kV/mm or more, 10 kV/mm or more, 15 kV/mm or more, or 20 kV/mm or more measured based on ASTM D149. Although a higher value of the insulation breakdown voltage refers to the resin layer having excellent insulation properties, the insulation breakdown voltage is not specifically limited, and when formation and the like of the resin layer are considered, the insulation breakdown voltage may be approximately 50 kV/mm or less, 45 kV/mm or less, 40 kV/mm or less, 35 kV/mm or less, or 30 kV/mm or less. Such an insulation breakdown voltage may be controlled by adjusting the insulation properties of resin materials of the resin layer and, for example, the insulation breakdown voltage may be adjusted by applying an insulating filler in the resin layer. A ceramic filler that will be described below has been generally known as a material that may provide insulation properties among thermally conductive fillers.

A flame retardant resin layer may be applied as the resin layer in consideration of safety. The term "flame retardant resin layer" in the present invention may refer to a resin layer having a grade V-0 based on UL 94 V Test (vertical burning test). Thus, the safety against fire and other accidents that may occur in the battery module may be obtained.

The resin layer may have a specific gravity of 5 or less. As another example, the specific gravity may be 4.5 or less, 4 or less, 3.5 or less, or 3 or less. The resin layer having a specific gravity in the above-described range is advantageous for manufacturing lighter battery modules. Since a lower value of the specific gravity is advantageous for making the module lighter, a lower limit is not specifically limited. For example, the specific gravity may be approximately 1.5 or more or 2 or more. Materials added to the resin layer may be adjusted so that the resin layer has a specific gravity in the above-described range. For example, when a thermally conductive filler is added, a method of adding a filler having a relatively low specific gravity through which a target thermal conductivity is obtained, that is, a filler of which gravity itself is low or a filler for which a surface treatment has been performed may be used.

A resin layer that does not include a volatile material is suitable, if possible. For example, the resin layer may include a nonvolatile material at 90 weight % or more, 95 weight % or more, or 98 weight % or more. The above-described nonvolatile material and a ratio may be defined by a method below. That is, a nonvolatile portion may be defined as the residue material after the resin layer is maintained at 100° C. for an hour, and accordingly, the ratio may be measured based on the initial weight of the resin layer and the weight after being maintained at 100° C. for an about hour.

In addition, the resin layer may be required to provide safety against chemically reacting to a surface of the battery case or battery cells even when the resin layer has excellent necessary resistance against degradation.

In addition, a lower contraction rate of the resin layer during or after a curing process may be advantageous for the resin layer. Thus, delamination or a gap that may be generated in manufacturing or using a module may be prevented. The contraction rate may be suitably adjusted in a range in which the above-described effect is obtained and, for example, may be under 5%, under 3%, or approximately under 1%. Since a lower value of the contraction rate is advantageous, a lower limit thereof is not specifically limited.

A lower coefficient of thermal expansion (CTE) may be advantageous for the resin layer. Thus, delamination or a gap that may be generated in manufacturing or using a module may be prevented. The CTE may be suitably adjusted in a range in which the above-described effect is obtained and, for example, may be under 300 ppm/K, under 250 ppm/K, under 200 ppm/K, under 150 ppm/K, or approximately under 100 ppm/K. Since a lower value of the CTE is advantageous, a lower limit thereof is not specifically limited.

Since tensile strength of the resin layer may be suitably adjusted, excellent shock resistance is thus obtained, and the module having a suitable durability may be provided. For example, the tensile strength may be adjusted in a range of approximately 1.0 MPa or more.

Since the elongation of the resin layer may be suitably adjusted, the excellent shock resistance thereof is thus obtained, and providing a module having a suitable durability may be possible. For example, the elongation may be adjusted in a range of approximately 10% or more or approximately 15% or more.

A suitable hardness may also be advantageous for the resin layer. For example, when the hardness of the resin layer is excessively high, the resin layer may become too brittle and have a bad influence on reliability. In addition, by adjusting hardness of the resin layer, shock and vibration resistance may be obtained, and the product durability may be obtained. For example, a shore A hardness of the resin layer may be less than 100, 99 or less, 98 or less, 95 or less, or 93 or less, or a shore D hardness thereof may be less than approximately 80, approximately 70 or less, approximately 65 or less, or approximately 60 or less. A lower limit of the hardness is not specifically limited. For example, a shore A hardness may be 60 or more, or a shore OO hardness may be 5 or more or approximately 10 or more. The hardness of the resin layer generally depends on the type or a ratio of a filler included in the resin layer, and when an excessive amount of the filler is included, the hardness is generally increased. However, a resin component included in the resin layer has an influence on the hardness similar to a silicone based resin having hardness that is lower than that of other resins such as an epoxy or urethane based resin.

The temperature corresponding to the 5% weight loss of the resin layer may be 400° C. or more, or the amount of residue of the resin layer at 800° C. may be 70 weight % or more based on thermogravimetric analysis (TGA). Through these properties, safety of the battery module may be further improved at a high temperature. As another example, the amount of residue at 800° C. may be approximately 75 weight % or more, approximately 80 weight % or more, approximately 85 weight % or more, or approximately 90 weight % or more. As still another example, the amount of residue at 800° C. may be approximately 99 weight % or less. The TGA may be performed in an environment of N2 provided at 60 cm$^3$/min, temperature ramp up speed at 20° C./min, and in a temperature range of 25° C. to 800° C. The result of the TGA may be obtained by adjusting composition of the resin layer. For example, the amount of residue at 800° C. depends on the type or a ratio of a filler included in the resin layer, and when an excessive amount of filler is included, the amount of residue is increased. However, since a silicone based resin generally has a thermal resistance higher than that of other resins such as an epoxy or urethane based resin, the amount of residue is larger, and accordingly, a resin material included in the resin layer has an influence on the hardness thereof.

The type of the resin layer may not be specifically limited and all of known curable resin materials may be used as long as the battery cell may be effectively immobilized, and the above-described materials properties are obtained as necessary. Materials that may be used may be an acrylic based resin, an epoxy based resin, a urethane based resin, an olefin based resin, an ethylene vinyl acetate (EVA) based resin, a silicone based resin, or the like, and accordingly, the resin layer may include the above-described resins. The resin layer may include the above-described resins as a main material among resin materials. That is, the acrylic based resin, epoxy based resin, urethane based resin, olefin based resin, EVA based resin, silicone based resin, or the like in all resin materials included in the resin layer may be approximately 70% or more, approximately 75% or more, approximately 80% or more, approximately 85% or more, or approximately 90% or more based on weight. The ratio may be approximately 99% or less or approximately 95% or less.

A material forming the resin layer, that is, a resin composition, may be an adhesive material as described above and may be a solvent type material, a water based material, or solvent free material, but it may be suitable that the resin layer is the solvent free resin layer in consideration of convenience and the like of a manufacturing process that will described below.

A material of the resin layer may be an active energy-ray curing type, wet curing type, a thermal curing type, a room temperature curing type, or the like, and it may be suitable that the material be the room temperature curing type in consideration of the convenience and the like of the manufacturing process that will described below.

The resin layer may include a filler in consideration of the above described thermal conductivity, insulation properties, thermal resistance (measured by TGA), specific gravity, or the like. By using a suitable filler, the resin layer in the above-described range may include the filler in consideration of the above described thermal conductivity, insulation properties, thermal resistance (measured by TGA), specific gravity, or the like. By using a suitable filler, thermal conductivity of in the above-described range may be obtained. For example, the filler may be a thermally conductive filler. The term "thermally conductive filler" refers to a material having thermal conductivity of approximately 1 W/mK or more, approximately 5 W/mK or more, approximately 10 W/mK or more, or approximately 15 W/mK or more. The thermally conductive filler has thermal conductivity of approximately 400 W/mK or less, approximately 350 W/mK or less, or approximately 300 W/mK or less. Although the type of the filler that may be used is not specifically limited, a ceramic filler may be used in consideration of the insulation properties. For example, particles of a ceramic such as alumina, aluminum nitride (AlN), boron nitride (BN), silicon nitride, ZnO, SiC, or BeO. In addition, as long as the insulation properties of the resin layer are obtained, use of a carbon filler such as graphite may be considered. The shape or ratio of the filler included in the resin layer is not specifically limited and may be selected in consideration of viscosity of the resin layer, possibility of sinking in the resin layer, a target thermal resistance or thermal conductivity, insulation properties, filling effect or dispersion properties, and the like. Generally, as the size of filler particles becomes larger, viscosity of a resin composition becomes higher, and a possibility of a filler to sink in the resin layer becomes higher. In addition, as the size of the filler particles becomes smaller, the thermal resistance tends to be higher. Accordingly, a suitable filler may be selected in consideration of the above-described aspect, and two or more types of fillers may be used as necessary. In addition, although it is advantageous to use a round shaped filler in consideration of a filled amount, a filler in a needle shape, plate shape, or the like may also be used in consideration of forming a network, conductivity, or the like. For example, the resin layer may include the thermally conductive filler having an average particle diameter in a range of 0.001 to 80 µm. As another example, an average particle diameter of the filler may be 0.01 µm or more, 0.1 µm or more, 0.5 µm or more, 1 µm or more, 2 µm or more, 3 µm or more, 4 µm or more, 5 µm or more, or approximately 6 µm or more. As still another example, an average particle diameter of the filler may be approximately 75 µm or less, approximately 70 µm or less, approximately 65 µm or less, approximately 60 µm or less, approximately 55 µm or less, approximately 50 µm or less, approximately 45 µm or less, approximately 40 µm or less, approximately 35 µm or less, approximately 30 µm or less, approximately 25 µm or less, approximately 20 µm or less, approximately 15 µm or less, approximately 10 µm or less, or approximately 5 µm or less.

A ratio of the filler included in the resin layer may be selected to obtain the above-described properties, for example, thermal conductivity and insulation properties in consideration of the properties of the resin layer. For example, the filler may be included at in the range of approximately 50 to 2,000 parts by weight with respect to the resin material of the resin layer of 100 parts by weight. As another example, the filler may have 100 parts by weight or more, approximately 150 parts by weight or more, approximately 200 parts by weight or more, approximately 250 parts by weight or more, approximately 300 parts by weight or more, approximately 350 parts by weight or more, approximately 400 parts by weight or more, approximately 500 parts by weight or more, approximately 550 parts by weight or more, approximately 600 parts by weight or more, or approximately 650 parts by weight or more.

The resin layer may further include a viscosity regulator, for example, a thixotropic additive, a diluent, a dispersant, a surface treatment agent, or a coupling agent for adjusting viscosity, for example, to raise or lower the viscosity, or for adjusting the viscosity according to shearing force.

The thixotropic additive may adjust the viscosity according to the shearing force of the resin composition for effectively performing a manufacturing process of the battery module. For example, fumed silica may be used as a thixotropic additive.

The diluent or dispersant is generally used for lowering the viscosity of the resin composition, and various types of known diluents or dispersants in the field may be used without limitation as long as the diluents or dispersants have the above-described functions.

The surface treatment agent is for surface treatment of the filler included in the resin layer, and various types of surface treatment agents known in the field may be used without limitation as long as the surface treatment agents have the above-described functions.

The coupling agent is used for improving the dispersion properties of the thermally conductive filler, and, for example, alumina and various types of coupling agents known in the field may be used without limitation as long as the coupling agents have the above-described function.

The resin layer may further include a flame retardant, a flame retardant supplement agent, or the like. Such a resin layer may form a flame retardant resin layer. Various known flame retardants may be applied without a specific limitation. For example, a solid phase flame retardant in a filler type, a liquid phase flame retardant, or the like may be applied. For example, the flame retardant may include an organic flame retardant such as melamine cyanurate or an inorganic flame retardant such as magnesium hydroxide but may not be limited thereto.

When an amount of filler that fills the resin layer is large, a liquid phase flame retardant material (triethyl phosphate (TEP), Tris(2-chloroethyl) phosphate (TCPP), tris (1,3-chloro-2-propyl) phosphate, or the like) may be used. In addition, a silane coupling agent that functions as a flame retardation promoter may be added.

The resin layer may include at least one of the above-described components.

As one example, the battery module may further include an insulating layer between the module case and the battery cells or the resin layer and the module case. FIG. 8 is a schematic view illustrating an insulating layer (40) formed between a resin layer (30) and a guiding portion (10*d*) formed on a lower plate (10*c*) of a case. By adding the insulating layer, problems of an electrical short phenomenon, occurrence of fire, or the like due to a contact between cells and the case due to a shock during use may be prevented. The insulating layer may be formed by using an insulation sheet having high insulation properties and thermal conductivity, or by coating with or injecting a material having insulation properties. For example, in a method of manufacturing the battery module, a process for forming the insulating layer may be performed before a resin composition is injected. A so-called thermal interface material (TIM) and the like may also be applied to form the insulating layer. As another method, the insulating layer may be formed of an adhesive material that, for example, may be formed by using a resin layer in which an amount of thermally conductive filler is small or a thermally conductive filler is not provided. Although a resin material used for forming the insulating layer may be, for example, an acrylic resin, an olefin resin such as poly vinyl chloride (PVC) and polyethylene (PE), an epoxy resin, a silicone, or a rubber material such as ethylene propylene diene monomer (EPDM) rubber but may not be limited thereto. The insulating layer may have an insulation breakdown voltage of approximately 5 kV/mm or more, approximately 10 kV/mm or more, approximately 15 kV/mm or more, 20 kV/mm or more, 25 kV/mm or more, or 30 kV/mm or more measured based on ASTM D149. A higher value of the insulation breakdown voltage refers to excellent insulation properties, and the insulation breakdown voltage is not specifically limited. For example, the insulation breakdown voltage of the insulating layer may be approximately 100 kV/mm or less, 90 kV/mm or less, 80 kV/mm or less, 70 kV/mm or less, or 60 kV/mm or less. The thickness of the insulating layer may be set to a suitably range in consideration of insulation properties, thermal conductivity, or the like and may be, for example, approximately 5 µm or more, approximately 10 µm or more, 20 µm or more, 30 µm or more, 40 µm or more, 50 µm or more, 60 µm or more, 70 µm or more, 80 µm or more, or 90 µm or more. In addition, the upper limit of the thickness is not specifically limited and may be, for example, approximately 1 mm or less, approximately 200 µm or less, 190 µm or less, 180 µm or less, 170 µm or less, 160 µm or less, or 150 µm or less.

Another aspect of the present invention also provides a method of manufacturing a battery module, e.g., the above-described battery module.

The method in the present invention may include injecting a resin composition in the above-described module case; accommodating a battery cells in the module case; and curing the resin composition to form the resin layer.

Order of injecting of the resin composition in the module case and accommodating of the battery cells in the module case is not specifically limited. For example, the resin composition may be first injected in the module case and the battery cells may be accommodated therein, or the battery module may be first accommodated in the module case and the resin composition may be injected therein.

The term "resin composition" in the present invention may refer to a state of the resin layer before curing, and the term "resin layer" may refer to a state of the resin layer after the curing.

The method of injecting of the resin composition in the module case may not be specifically limited, and known methods may be applied thereto. For example, a method of injecting the resin composition by pouring the resin composition through an opening of the module case, injecting the resin composition through the opening formed in the module case, spraying the resin composition on both of the battery cells and the battery module, or the like may be applied. The injecting process may also be performed while the battery module or the battery cells are constantly being vibrated for suitable immobilizing.

The type of injected resin composition is not specifically limited and may be suitably selected when meeting target materials properties requirements.

For example, the above-described injected resin composition may be a resin composition that may meet materials properties requirements such as the above-described thermal conductivity or may form a resin layer that includes a material for meeting the materials properties requirements.

Such a resin composition may be a solvent based resin composition, a water based resin composition, or solvent free resin composition, and it may be suitable that the resin composition be the solvent free resin composition.

In addition, the resin composition may be an active energy-ray curing type, a wet curing type, a thermal curing type, a room temperature curing type, or the like, and it may be suitable that the resin composition be the room temperature curing type.

The resin composition may be a resin composition that includes one or more among various additives such as the above-described thermally conductive fillers.

Such a resin composition may be a single-component type, a two-component type, a three-component type, or the like.

The accommodating of the battery cells in the module case in which the resin composition has been injected or in the module case before the resin composition is injected is not specifically limited.

The accommodating of the battery cells may be performed by disposing the battery cells at a suitable position in the module case in consideration of target disposition and the like. In addition, when a cartridge structure is provided, the above-described process may be performed by positioning the battery cells at a suitable position in the cartridge structure, or inserting the cartridge structure on which the battery cells are positioned into the module case.

Bonding between the battery cells or between the battery cells and the module case may be accomplished by curing the injected resin composition after the battery cells are accommodated. The curing of the resin composition is not specifically limited.

For example, the above-described process may be performed by a method of emitting active energy-rays such as ultraviolet rays to the resin composition when the resin composition is the active energy-ray curing type, maintaining under a suitable humidity when the resin composition is the wet curing type, applying suitable heat when the resin composition is the thermal curing type, or maintaining the resin composition under at room temperature when the resin composition is the room temperature curing type, and the like.

In addition, the resin composition may be heated for a short time before or during curing or before or during the accommodating of the battery cells to be, for example, in a range of approximately 40° C. to 50° C. under a condition in which safety of the battery cells is not influenced in terms of tack time and processing characteristics.

Still another aspect of the present invention also provides a resin composition that may be used for the method of manufacturing the same or forming the battery module having the above-described structure.

As described above, the resin composition is not specifically limited, and all known resin compositions may be used as long as the battery cells may be effectively immobilized to the module case and the above-described materials properties requirements may be obtained as necessary.

Such a resin composition may include an acrylic based resin composition, an epoxy based resin composition, an urethane based resin composition, an olefin based resin composition, an EVA based resin composition, a silicone based resin composition, or the like but may not be limited thereto.

The resin composition may be a solvent based resin composition, a water based resin composition, or solvent free resin composition, but it may be suitable that the resin composition be the solvent free resin composition.

The resin composition may have a resin composition that is active energy-ray curing type, a wet curing type, a thermal curing type, a room temperature curing type, or the like, and it may be suitable that the resin composition be the room temperature curing type resin composition.

For example, in consideration of target materials properties, the resin composition prepared by adding suitable amounts of additives such as the above-described fillers and the like to the resin composition that may form an acrylic based adhesive, an epoxy based adhesive, an urethane based adhesive, an olefin based adhesive, an EVA based adhesive, or a silicone based adhesive may be applied to the above-described method.

The above-described resin composition may include a radical initiator and a catalyst for the radical initiator in consideration of the room temperature curing properties and the like. For example, the resin composition may include an acyl peroxide initiator such as a benzoyl peroxide and the like and a catalyst such as a toluidine compound for the initiator, and accordingly, a suitable curing system may be implemented.

The resin composition may further include various materials in addition to the above-described materials as necessary.

Yet another aspect of the present invention also provides a battery pack, for example, a battery pack including two or more of the above-described battery modules. In the battery pack, the battery modules may be electrically connected. The method of forming of the battery pack by connecting two or more battery modules is not specifically limited, and all of known methods may be applied.

Yet another aspect of the present invention also provides equipment including the battery module or the battery pack. A vehicle such as an electrical vehicle may be exemplified as the apparatus, but the apparatus is not limited thereto. All uses that need an output of the secondary battery may be included in the equipment. For example, the method of forming of the vehicle using the battery module or the battery pack is not specifically limited, and a general method may be applied thereto.

Advantageous Effects

According to embodiment of the present invention, a battery module manufactured with a simple process and low cost but having excellent output, thermal dissipation properties, and the like for its size, a method manufacturing the same, and a resin composition applied to the method of manufacturing the same are provided.

REFERENCE NUMERALS

Figure 1:
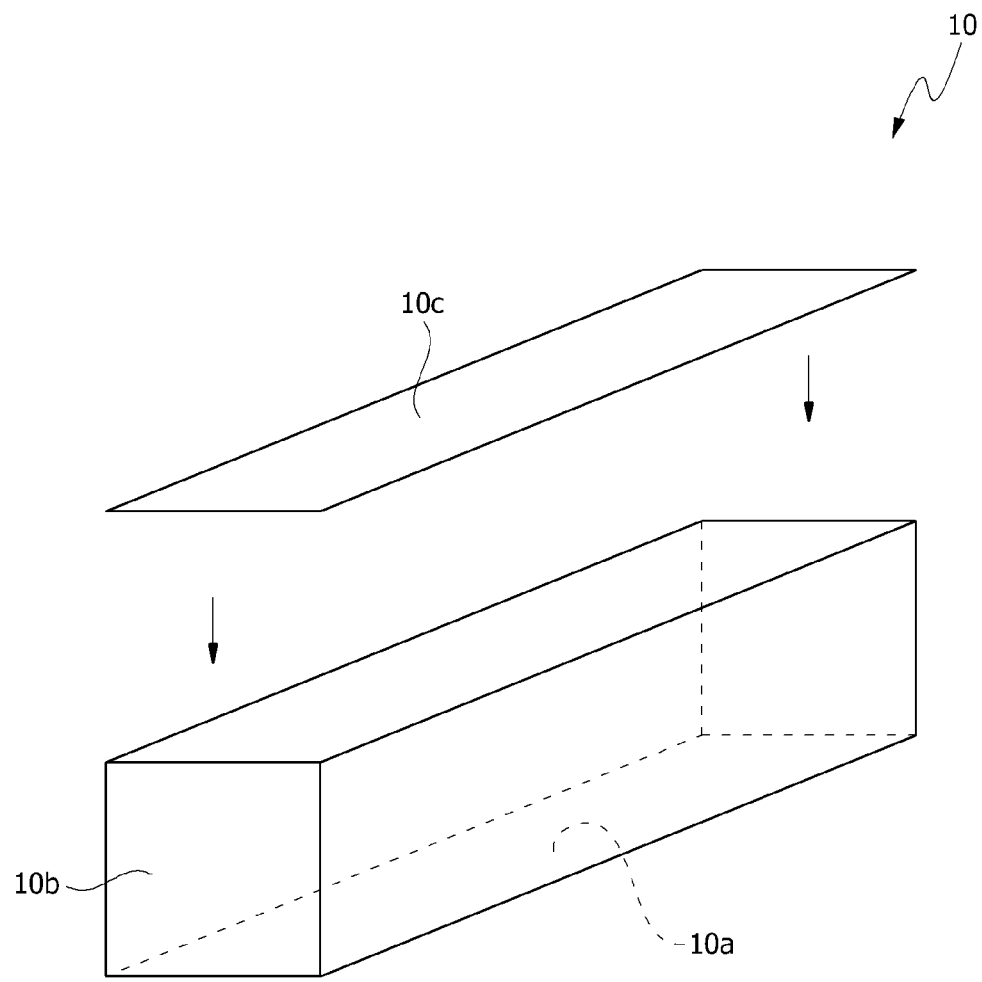
FIG. 1 is a schematic view illustrating an example of a module case that may be applied to the present invention.
Figure 2:
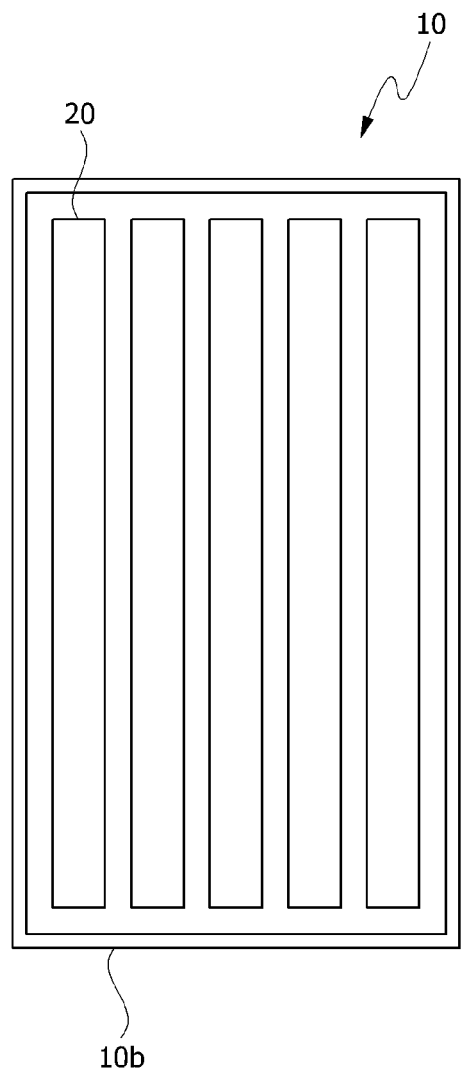
FIG. 2 is a view illustrating battery cells accommodated in the module case.
Figure 3:
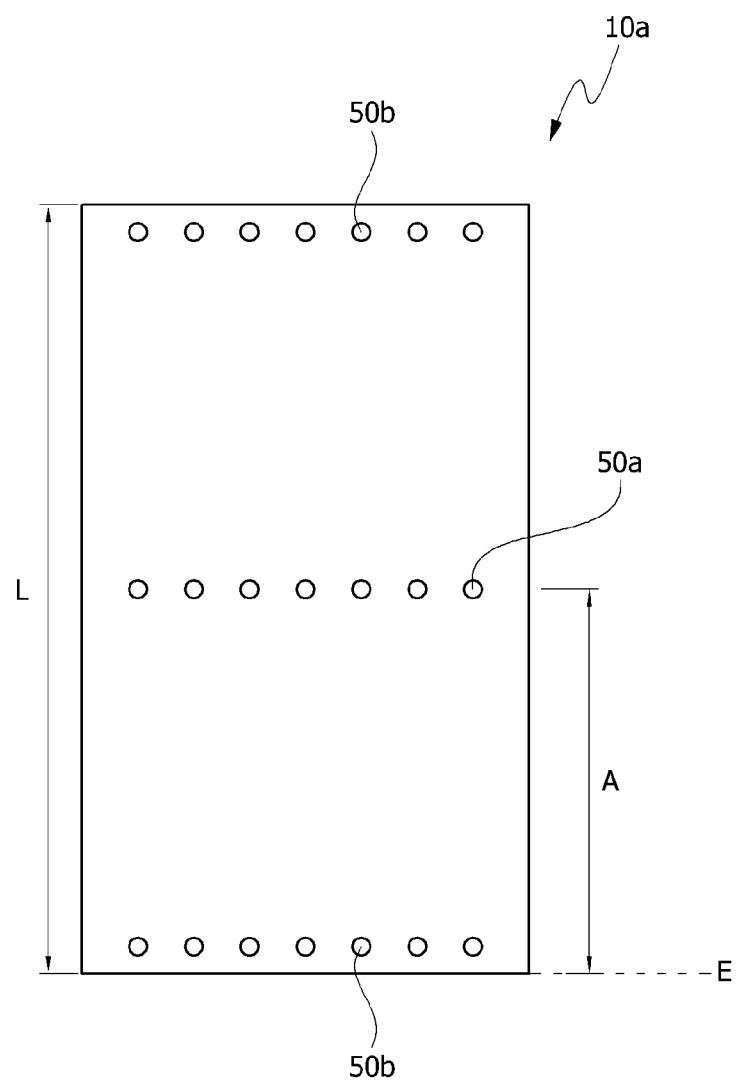
FIG. 3 is a view illustrating an example of a lower plate in which injection holes and observation holes are formed.
Figure 4:
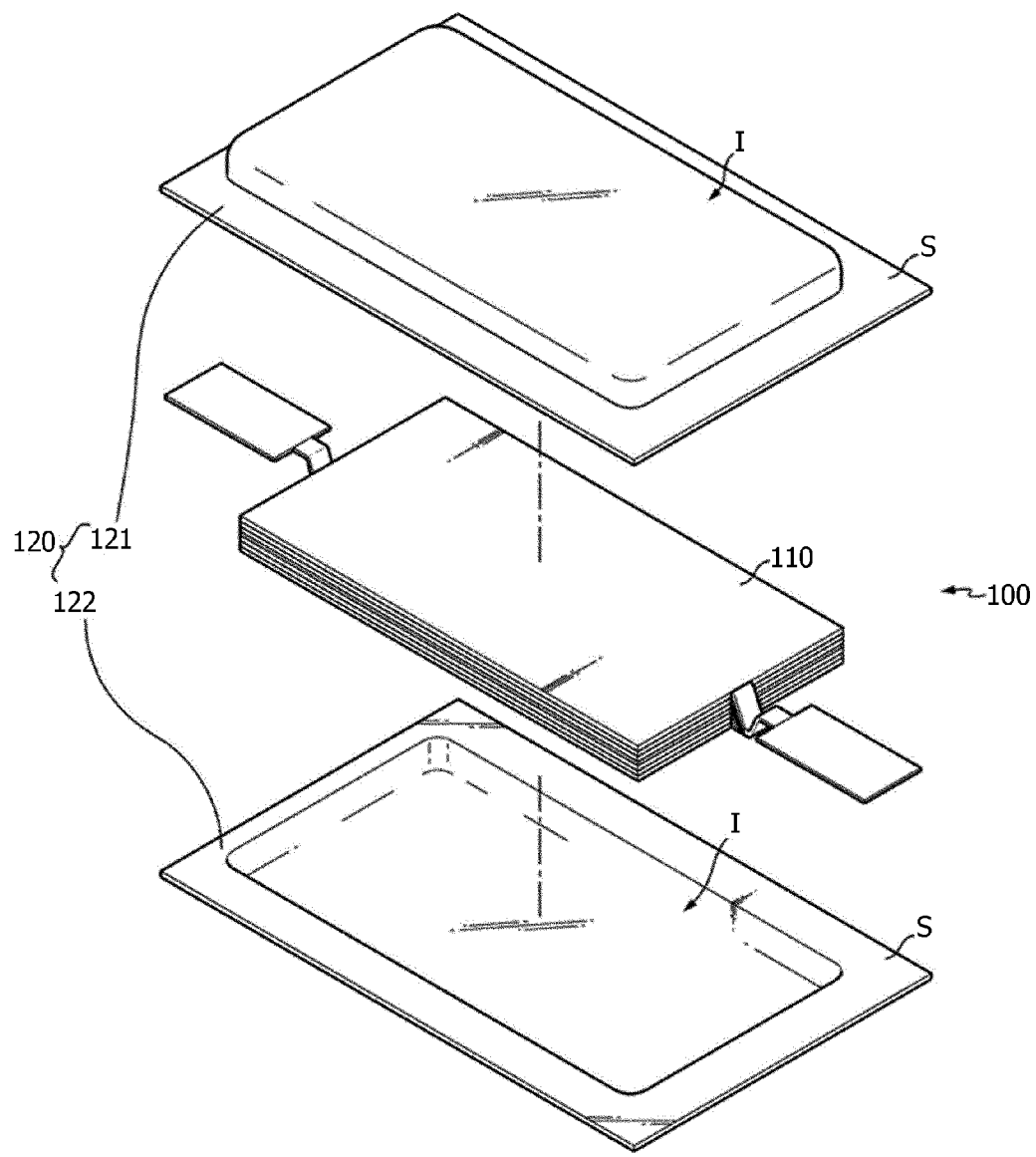
FIGS. 4 and 5 are schematic views illustrating examples of battery pouches which may be used as the battery cells.
Figure 5:
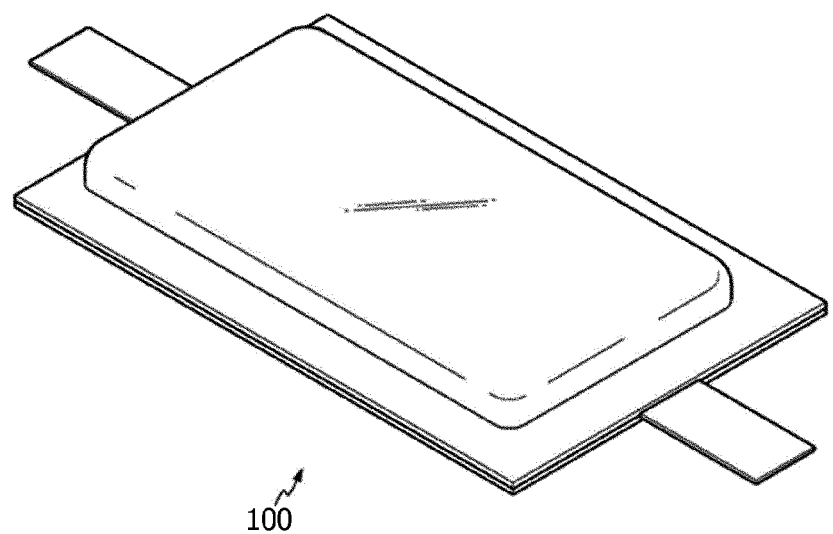
Figure 6:
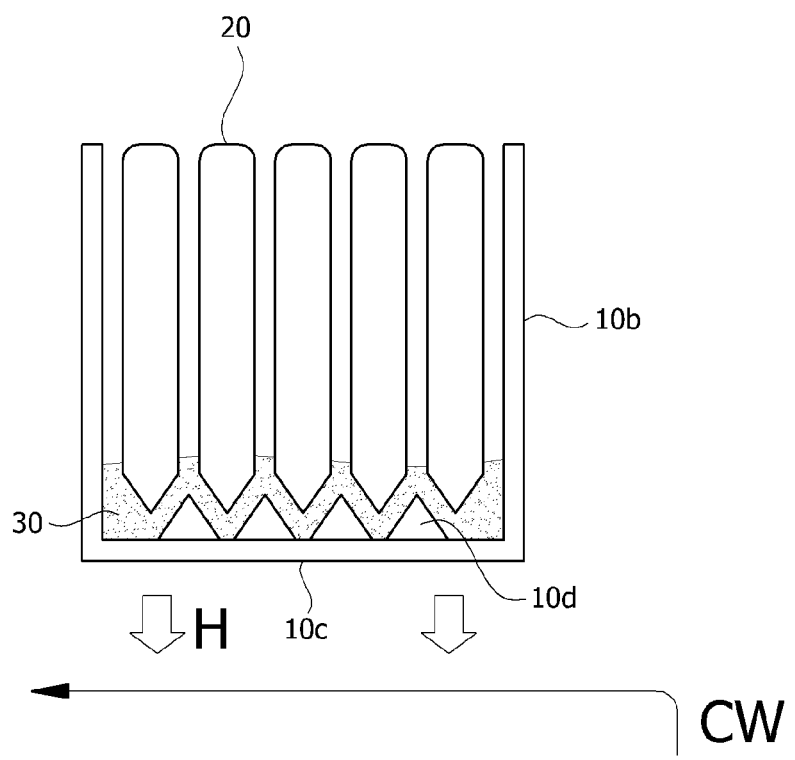
FIGS. 6 to 8 are schematic views illustrating examples of structures of the battery module.
Figure 7:
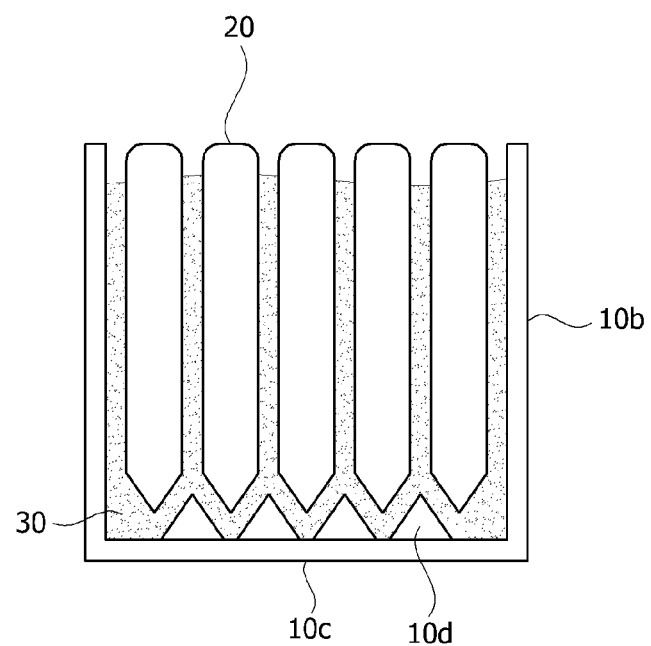
Figure 8:
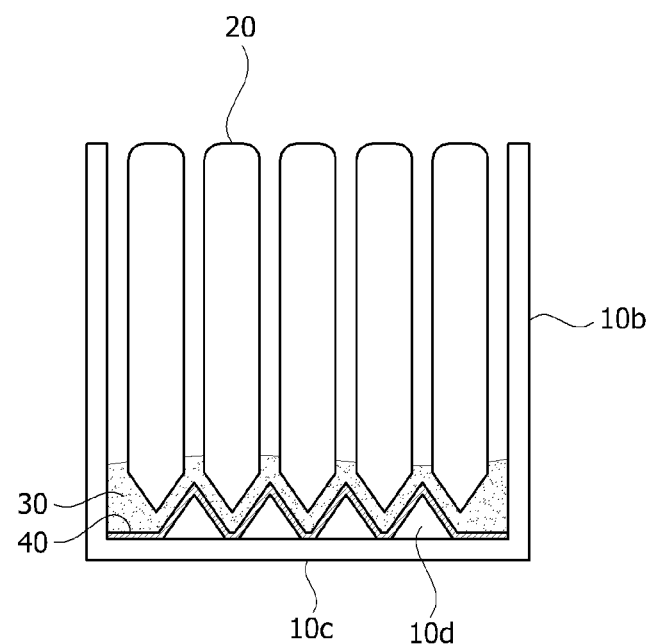

10: MODULE CASE
10A: LOWER PLATE
10B: SIDEWALL
10C: UPPER PLATE
10D: GUIDING PORTION
20: BATTERY CELL
30: RESIN LAYER
50A: INJECTION HOLE
50B: OBSERVATION HOLE
40: INSULATING LAYER
100: POUCH TYPE CELL
110: ELECTRODE ASSEMBLY
120: EXTERIOR MATERIAL
121: UPPER POUCH
122: LOWER POUCH
S: SEALING PORTION

MODES OF THE INVENTION

Hereinafter, although the present invention will be described with reference to examples and comparative examples, the scope of the present invention is not limited to the scope that will be described below.

1. Method of Measuring Thermal Conductivity of Resin Layer

Thermal conductivity of a resin layer was measured based on ASTM D5470 standard. That is, based on ASTM D5470 standard, a thermal equilibrium state (temperature change is approximately 0.1° C. or less in five minutes) was reached by positioning the resin layer between two copper bars, having one of the two copper bars be in contact with a heater, having the other be in contact with a cooler, maintaining the heater at a constant temperature, and adjusting the capacity of the cooler. The temperature of each copper bar was measured in the thermal equilibrium state, and thermal conductivity K (unit: W/mK) was evaluated using the following equation. During evaluating the thermal conductivity, pressure applied to the resin layer was adjusted to be approximately 11 Kg/25 cm², and when the thickness of the resin layer was changed during measurement, the thermal conductivity was calculated based on a final thickness.

<Equation of Thermal Conductivity>

$$K=(Q\times dx)/(A\times dT)$$

In Equation of thermal conductivity, K denotes thermal conductivity (W/mK), Q denotes heat that transfers per unit time (unit: W), dx denotes a thickness of the resin layer (unit: m), A denotes a cross-sectional area of the resin layer (unit: m2), and dT denotes a temperature difference of the copper bars (unit: K).

2. Method for Evaluating Specific Gravity

Specific gravity of the resin layer was measured based on ASTM D792 standard. For example, the weight of the resin layer is measured based on the standard, the weight is then measured again in water, and density and specific gravity may be calculated using the difference between the measured weights, or a predetermined amount of power or pellet (for example, approximately 5 g) is put into a premeasured volume with a pyrometer, and the specific gravity may be calculated using differences of the weight and volume thereof at 73.4° F.

3. Method of Thermogravimetric Analysis (TGA).

TGA was performed using an instrument, TA400 made by TA Instruments. The analysis was performed using a resin layer of approximately 10 mg, at a temperature in a range of 25° C. to 800° C., at heating speed of 20° C./min, and under an $N_2$ atmosphere of 60 cm³/min.

4. Measurement of Insulation Breakdown Voltage

An insulation breakdown voltage of the resin layer was evaluated based on ASTM D149 standard. The insulation breakdown voltage refers to a voltage applied up to the moment at which a material loses insulation properties, the insulation properties disappear as conductivity is rapidly increased at a high voltage of a certain level or more. The breakdown voltage refers to a minimum voltage required for causing an insulation breakdown, and the insulation properties are generated by completely generating an arc through a specimen. A voltage gradient may be obtained by dividing a voltage at the moment at which a breakdown occurs by an insulation thickness. The insulation breakdown voltage was measured using an instrument, PA70-1005/202 made by Backman Industrial Co., and here, the thickness of the specimen (resin layer) was approximately 2 mm, and the diameter was approximately 100 mm 5. Measurement of Adhesion Strength A lower plate of a module case formed of aluminum in which an insulation film (epoxy and/or polyester based insulating layer) and a polyethylene terephthalate (PET) film were attached using a resin layer, and here, the width of attachment was approximately 10 mm Here, the thickness of the resin layer was approximately 1 mm. The attachment was performed by loading an uncured resin composition between the insulation film and the PET film and curing the resin composition. Next, adhesion strength was measured while the PET film was being delaminated at speed of approximately 300 mm/min and a delamination angle of 180°.

6. Measurement of Hardness

Hardness of a resin layer was measured based on ASTM D 2240, and JIS K 6253 standards. ASKER, a durometer hardness instrument, was used for measuring the hardness. Initial hardness was measured by applying a weight of 1 Kg or more (approximately 1.5 Kg) to a flat sample (the resin layer), and hardness was evaluated by confirming a stable measurement value after 15 seconds.

7. Reliability Evaluation of Battery Module.

Reliability of a battery module was evaluated by measuring thermal conductivity and a withstand voltage of the module. The withstand voltage is measured for checking the highest applied voltage up to which the battery module tolerates without breaking down. In below examples and comparative examples, the withstand voltage was measured while an applied voltage was started from approximately 1.2 kV and increased. The thermal resistance of the battery module was evaluated by positioning the module between upper and lower blocks of the measurement instrument, executing DynTIM Tester software on a controlling computer, determining and inputting a heating current and measurement time in the software, completing setting of parameters such as the measurement pressure and measurement condition of the thermal resistance, and measuring the thermal resistance depending on the measurement conditions by using a T3Ster and DynTIM tester controlled by software. Reliability according to each evaluation result was classified based on below reference.

<Reliability Evaluation Reference according to Withstand Voltage Resistance>

Good: Withstand voltage is 2 kV or more.

Fair: Withstand voltage is less than 2 kV and 0.5 kV or more.

Poor: Withstand voltage is less than 0.5 kV.

<Reliability Evaluation Reference according to Thermal Resistance Evaluation>

Good: Thermal resistance is 2 K/W or less

Fair: Thermal resistance is greater than 2 K/W and 6 K/W or less.

Poor: Thermal resistance is greater than 6 K/W.

EXAMPLE 1

Resin Composition Preparation

A resin composition with viscosity of approximately 250,000 cP at room temperature was prepared by mixing an amount of alumina (particle size distribution: 1 to 60 μm) into a two-component urethane based adhesive composition (main material: HP-3753 (KPX Chemical Co., Ltd) and hardener: TLA-100 (AsshiKASEI)) such that the two-component urethane based adhesive composition has thermal conductivity of approximately 3 W/mK after curing (in a range of approximately 600 to 900 parts by weight with respect to 100 parts by weight of the total two-components solid content), and the resin composition was applied to preparing a battery module.

Battery Module Manufacturing

A battery module was formed using a module case that is in the shape shown in FIG. 1 and includes a lower plate, a sidewall, and an upper plate formed of aluminum. A guiding portion that guides installation of battery cells was formed on an inside surface of the lower plate of the module case. Injection holes for injecting a resin composition were formed at a regular gap in a central portion of the lower plate of the module case. Observation holes were formed at end portions of the lower plate. A bundled pouch in which a plurality of battery pouches were stacked was accommodated in the module case. Then, the top surface of the module case was covered by the upper plate. Next, the prepared resin composition was injected until it was confirmed that the resin composition reached the observation holes, and then the battery module was manufactured by curing the resin composition.

EXAMPLE 2

Resin Composition Preparation

A resin composition with viscosity of approximately 130,000 cP at room temperature was prepared by mixing an amount of alumina (particle size distribution: 1 to 60 μm) into a two-components silicone based adhesive composition (main material: SL5100A (KCC Corporation), hardener: SL5100B (KCC Corporation)) such that the two-component silicone based adhesive composition had thermal conductivity of approximately 3 W/mK after curing (in a range of approximately 800 to 1200 parts by weight with respect to 100 parts by weight of the total two-components solid content), and the resin composition was applied to manufacturing the following battery module.

Battery Module Manufacturing

A battery module was used that had the same structure as that of the Example 1 however in which an injection hole and an observation hole for injecting a resin composition were not formed. The battery module was manufactured by coating a front surface of an inside surface of the corresponding case with the prepared resin composition with a thickness of approximately 500 μm, accommodating the same battery cells as that of the Example 1, covering an upper plate, and curing a layer of the resin composition.

EXAMPLE 3

A battery was identically manufactured with that of the Example 1 except using a resin composition whose viscosity was adjusted to approximately 350,000 cP at room temperature by mixing an amount of alumina (particle size distribution: 1 to 60 μm) into a two-component urethane based adhesive composition (main material: PP-2000(KPX Chemical), hardener: TLA-100 (AsshiKASEI)) such that the two-components urethane based adhesive composition had thermal conductivity of approximately 3.5 W/mK after curing (in a range of approximately 600 to 900 parts by weight with respect to of 100 parts by weight of the total two-components solid content).

EXAMPLE 4

A battery was identically manufactured with that of the Example 1 except using a resin composition whose viscosity was adjusted to approximately 500,000 cP at room temperature by mixing an amount of alumina (particle size distribution: 1 to 60 μm) into an adhesive composition having an epoxy based room temperature curing type made by KUKDO Chemical Co., Ltd such that the adhesive composition had thermal conductivity of approximately 3 W/mK after curing (in a range of approximately 600 to 900 parts by weight with respect to 100 parts by weight of the total two-components solid content).

EXAMPLE 5

A battery was identically manufactured with that of the Example 2 except using a resin composition whose viscosity was adjusted to approximately 2,000,000 cP at room temperature by mixing an amount of graphite into a two-component silicone based adhesive composition (main material: SL5100A (KCC Corporation), hardener: SL5100B (KCC Corporation)) such that the two-component silicon based adhesive composition had thermal conductivity of approximately 1.5 W/mK after curing (in a range of approximately 100 to 300 parts by weight with respect to 100 parts by weight of the total two-components solid content).

EXAMPLE 6

A battery was identically manufactured with that of the Example 2 except using a resin composition whose viscosity was adjusted to approximately 100,000 cP at room temperature by mixing an amount of alumina (particle size distribution: 1 to 60 μm) into a two-component silicone based adhesive composition (main material: SL5100A (KCC Corporation), hardener: SL5100B (KCC Corporation)) such that the adhesive composition had thermal conductivity of approximately 1.5 W/mK after curing (in a range of approximately 300 to 500 parts by weight with respect to of the total two-components solid content 100 parts by weight of the total two-components solid content).

EXAMPLE 7

A battery was identically manufactured with that of the Example 1 except using a resin composition whose viscosity was adjusted to approximately 150,000 cP at room temperature by mixing an amount of alumina (particle size distribution: 1 to 60 μm) into a two-component urethane based adhesive composition (main material: PP-2000(KPX Chemical), hardener: TLA-100 (AsshiKASEI)) such that the two-component urethane based adhesive composition had thermal conductivity of approximately 2 W/mK after curing (in a range of approximately 400 to 900 parts by weight with respect to 100 parts by weight of the total two-components solid content) to the two-components urethane based adhesive composition.

COMPARATIVE EXAMPLE 1

A battery module was identically manufactured with that of the Example 2 except an adhesive composition was not used, that is, did not form a resin layer.

Materials properties of the resin layers and reliabilities of the battery modules from the above examples and comparative examples were measured, summarized, and input in table 1 below.

TABLE 1

|  |  | Examples | | | | | | | Comparative example |
|---|---|---|---|---|---|---|---|---|---|
|  |  | 1 | 2 | 3 | 4 | 5 | 6 | 7 | 1 |
| Resin layer | Thermal conductivity (W/mK) | 3 | 3 | 3.5 | 3 | 1.5 | 1.5 | 2 | — |
|  | Specific gravity | 3.1 | 3.1 | 3.2 | 3.2 | 2 | 2 | 2.6 | — |
|  | Residue at 800° C. (weight %) | >80 | >80 | >80 | >80 | about 60 | about 60 | about 50 | — |
|  | Adhesion strength (gf/10mm) | 500 | 100 | 450 | 600 | 80 | 90 | 500 | — |
|  | hardness (shore A) | 90 | 60 | 90 | 100 | 40 | 40 | 70 | — |
|  | Insulation breakdown voltage (kV/mm) | 15 | 11 | 10 | <8 | 2 | 5 | 4 | — |
| Reliability (withstand voltage) |  | good | good | good | fair | fair | fair | fair | poor |
| Reliability (thermal resistance) |  | good | good | good | fair | fair | fair | fair | poor |

It is apparent from the result of table 1 that materials properties of a resin layer are influenced by the type and ratio of resin used for the resin layer, and accordingly reliability of a module is also influenced.

For example, it is apparent from a comparison between Examples 1, 2, and 4 that when alumina is added to obtain the same level of thermal conductivity, adhesion strength is higher in the order of an epoxy base resin layer, an urethane based resin layer, and a silicone based resin layer, hardness is higher in the order of an epoxy based resin layer, an urethane based resin layer, and a silicone based resin layer, and specific gravities and TGA results of thermal resistance were adjusted to a similar level. It is apparent that hardness in the case of Example 4 is slightly higher than those of Examples 1 and 2, and, accordingly, reliability result is slightly lowered.

In addition, in is apparent from a comparison among Examples 2, 5, and 6 or among Examples 1, 3, and 7 that when the same material based resins are used, thermal conductivity, specific gravity, TGA result for thermal resistance, hardness, and the like were changed according to the type and amount of a filler. For example, in the case of Example 7, by applying an amount of filler less than those of the cases of Examples 1 and 3, values of thermal conductivity and specific gravity were slightly low, TGA result for thermal resistance was also slightly lower, although adhesion strength was at a similar level, hardness was slightly lowered, and particularly, an insulation breakdown voltage was lowered due to lowering of a ratio of the filler that influenced obtaining insulation properties. Accordingly, it is apparent that reliability evaluation result of Example 7 is slightly lower than those of Examples 1 and 3.

The invention claimed is:

1. A method of manufacturing a battery module, comprising:
   injecting a resin composition into a module case of a battery module, the module case including a lower plate and a sidewall forming an inside space, and the resin composition being a room temperature curing type resin composition;
   accommodating a plurality of battery cells in the inside space of the module case such that a first end portion of each of the battery cells faces the lower plate, each of the plurality of battery cells having a second end portion opposite to the first end portion; and
   after the step of accommodating the plurality of battery cells in the inside space, curing the resin composition in the inside space of the module case so as to form a resin layer therein, the curing being performed by maintaining the injected resin composition at room temperature,
   wherein the resin layer partially fills the inside space of the module case, such that the resin layer contacts the lower plate of the module case and each of the first end portions of the plurality of battery cells, but the resin layer does not contact each of the second end portions of the plurality of battery cells.

2. The method of claim 1, wherein the resin composition is injected into the inside space of the module case after the step of accommodating the plurality of battery cells in the inside space, and wherein the resin composition is injected into the inside space through an injection hole provided in the lower plate or the sidewall.

3. The method of claim 2, wherein the lower plate or the sidewall in which the injection hole is provided includes an observation hole.

4. The method of claim 1, wherein the resin layer comprises thermally conductive fillers and has thermal conductivity of 1.5 W/mK or more.

5. The method of claim 4, wherein the thermally conductive fillers are ceramic particles.

6. The method of claim 1, wherein the resin layer is formed so as to conform to the plurality of battery cells.

7. The method of claim 1, wherein the sidewall or the lower plate in contact with the resin layer includes a thermally conductive region.

8. The method of claim 7, wherein a contact ratio of the resin layer to the thermally conductive region is 80% or more of the entire area of the thermally conductive region.

9. The method of claim 1, wherein the resin layer comprises thermally conductive fillers and has thermal conductivity of 2 W/mK or more.

10. The method of claim 1, wherein the resin layer has an insulation breakdown voltage of 10 kV/mm or more.

11. The method of claim 1, wherein the resin layer has adhesion strength of 1,000 gf/10 mm or less.

12. The method of claim 1, wherein the resin layer has a specific gravity of 5 or less.

13. The method of claim 1, wherein a shore A hardness of the resin layer is less than 100 or a shore D hardness is 70 or less.

14. The method of claim 1, wherein, in a thermogravimetric analysis (TGA), the amount of residue of the resin layer at 800° C. is 70 weight % or more.

15. The method of claim 1, wherein the resin layer includes an acrylic resin, an epoxy resin, an urethane resin, an olefin resin, an ethylene vinyl acetate (EVA) resin, or a silicone resin.

16. The method of claim 1, wherein the resin layer includes a thixotropic additive, a diluent, a dispersant, a surface treatment agent, a flame retardant, or a coupling agent.

17. The method of claim 1, wherein the resin layer has a thickness in a range of 100 μm to 5 mm.

18. The method of claim 1, wherein the step of curing the resin composition is performed while the resin composition is in contact with the plurality of battery cells.

* * * * *